April 24, 1934.  R. BRAUN  1,956,233
TIPPED TOOL AND WORKING IMPLEMENT
Filed Aug. 22, 1932
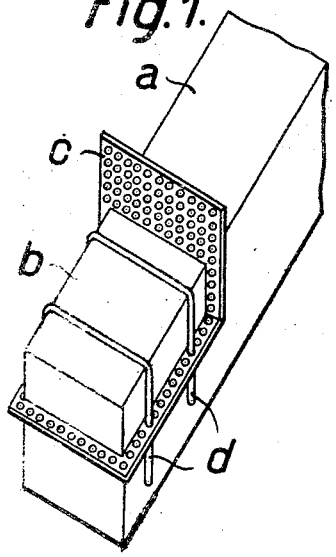
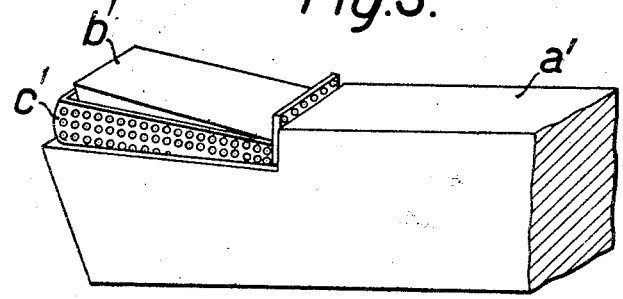
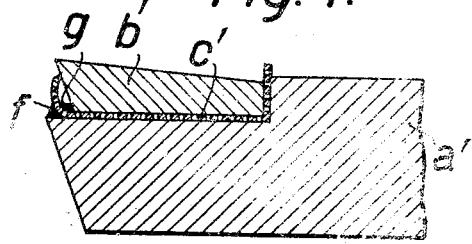
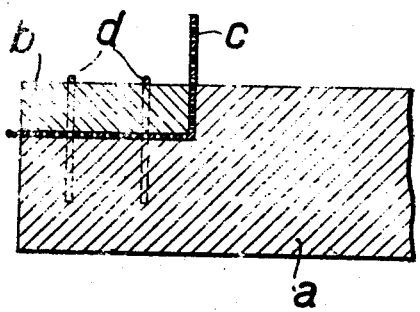
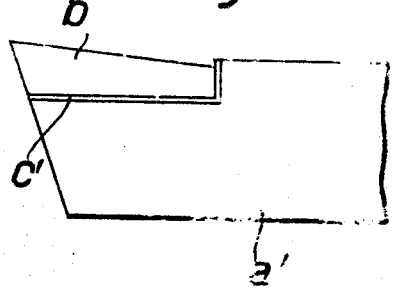

Patented Apr. 24, 1934

1,956,233

UNITED STATES PATENT OFFICE 1,956,233

TIPPED TOOL AND WORKING IMPLEMENT

Richard Braun, Stuttgart, Germany, assignor to Fried. Krupp Aktiengesellschaft, Essen-on-the-Ruhr, Germany Application August 22, 1932, Serial No. 629,942 In Germany January 29, 1931

4 Claims. (Cl. 29—95)

The invention relates to tipped tools and working implements and more particularly to tools and implements of this class in which a tip manufactured from a material of high cutting capacity, such as alloys of carbides, borides, nitrides or silicides, is soldered to a shank made from a high percentage steel alloy, such a high speed tool steel, by means of an intermediary strip or insert manufactured from a tough material, such as iron or steel. The invention has particular reference to this insert and provides that the insert at least at the places where it is in contact with the tip and the shank of the tool, is provided with perforations in which in soldering the solder enters, the insert preferably being provided with a copper coating and projecting beyond the surfaces to be soldered. Instead of covering the insert with copper, the required soldering copper may be supplied to the soldering place separately only immediately before the soldering.

It is known that certain metallic substances when melted form gases which remain in the solidified mass in the form of gas bubbles and impair the mechanical properties of the material. When a liquefied metal is in a space where gases soluble in the metal exist, the latter takes up a determined quantity of the gas. Since the solution of a gas in a metal is possible only by the gas on the surface of contact between gas and metal entering into the latter until the content of gas has become equal at all places in the metal mass, it follows that gas soluble in a metallic substance is capable of diffusing through the latter. This diffusion, however, can be prevented by barring the access of the gases to the liquefied metal, by covering it for example with borax. An absolutely gasless condition, however, is scarcely to be obtained in practice.

It is to be presumed that, like gas solutions in water, also gas solutions in liquefied metal do not instantaneously yield, when cooled, the gas in excess over the proportion of solution corresponding to the prevailing temperature, but that this excess gas is retained in the mass, forming an oversaturated solution. Therefore no change of state takes place, what is called "supercooling". The supercooled state can be suppressed by agitating the liquefied metal, whereby the gas in excess briskly separates from the metal like the carbonic acid from mineral water which is saturated with gas and in the state of rest is calm but foams up when agitated. It is apparently this phenomenon which is obtained in soldering by means of a perforated insert and the result thereof is that the soldered joint proper remains free from noxious gas bubbles.

The difference in expansion of the tip material and that of the shank are compensated for by the insert. As known, it is impossible to eliminate the stresses arising in direct soldering together on plane surfaces two metal pieces of different coefficients of expansion. Conditions change, however, at once, if the insert has a curved shape, as the different stresses then balance one another. Now experience has shown that the perforations in the insert according to the invention have the effect of such a curved shape and make the soldered joint elastic. For, the perforations have practically the effect of individual curved bars, provided the heat stresses caused during working by the differences in temperature do not exceed the elastic limit both of tension and compression of the metal. Consequently if the heat stresses arising due to uneven heating in such a bar (since the tip material becomes hotter than the shank) do not exceed the elastic limit of the material, these stresses disappear again when the different temperatures are balanced. Hence, these stresses are only temporary ones.

In the soldered joint established according to the invention the stresses occurring in the individual cells of the perforated insert act an important part. Probably during cooling the contraction of the metal in the cells takes place uniformly and normally to, and from the walls of the cell toward the core of the solder metal which fills the perforations like journals. It is further very probable that in liquefied metallic substances previous to crystallization a formation of spongy spots or cells takes place. Now the perforations in the insert according to the invention form such cells in which impurities and gas bubbles collect and rise, so that there is a smaller adhesion of the solder in the perforations, all the more since the solidifying mass during cooling contracts and therefore stresses arise in each perforation. The provision of the perforations thus results in the feature that the rise of gas bubbles and impurities takes place within these perforations, that is where the soldering metal solidifies last due to its greater mass which remains liquid the longest time, whilst in contrast thereto the soldering joint proper becomes and remains free from gas bubbles and the like and shows an excellent adhesion. The solidification of the solder then takes place slowly in a space without access of outer air.

A further important advantage is afforded by the use of perforated inserts according to the invention, namely, that there is no danger of the solder metal flowing off from the higher places when the tool during the soldering operation is held in any inclined position.

As mentioned above, the insert may project beyond the soldering place proper, so that one may observe on these projecting margins, when melting of the soldering metal and thus soldering proper begins. Furthermore, the projecting margins of the insert may be bent toward the tip. In this way a trough is formed in which the soldering metal flowing down from the wall of the trough is collected, whereby an abundant supply of the solder to the surfaces to be soldered together and a brisk motion of the solder is achieved which favors the escapement of the gas bubbles.

In order that the invention may be clearly understood and readily carried into effect, some embodiments of the invention will now be described by way of example with reference to the accompanying drawing in which Figure 1 is a perspective view of a tool composed of a shank, a tip, and an insert, previous to the soldering, Figure 2 is a longitudinal section of this tool, likewise previous to the soldering, Figure 3 is a perspective view of another tool with the insert bent up on its projecting edges, previous to the soldering, Figure 4 is a longitudinal section of the tool of Figure 3 after the soldering, and Figure 5 is a lateral view of this tool in finished state.

Referring first to Figures 1 and 2, $a$ denotes the shank of the tool which preferably is manufactured from a high percentage steel alloy, such as high speed tool steel, $b$ is the tip made from a material of high cutting capacity, and $c$ denotes the perforated insert which for example is manufactured of iron or steel and on both sides provided with a coating of copper. When the parts are heated in soldering, the copper melts and fills the perforations of the insert $c$. The perforations situated on the projecting margins of the insert may be used, as will be seen from Figures 1 and 2, to apply wire straps $d$ of suitable shape which serve to hold the parts to be interconnected in the proper mutual position for the soldering. Instead of the wire straps $d$ illustrated, of course simple wires passed through the marginal perforations may be used to provisionally hold the parts together.

In the embodiment illustrated in Figures 3 to 5 the shank of the tool is denoted by $a'$, the cutting tip by $b'$, and the insert by $c'$, the latter as in the first embodiment being covered on both sides with copper. The projecting margins of the insert $c'$ are upwardly bent toward the tip $b'$ so as to form a trough on the free sides of the latter. The supporting surface of the shank $a'$ in turn projects beyond the insert $c'$ on the free sides. In soldering, the copper coating of the insert melts, the molten copper flowing down on the bent-up margins, as illustrated in Figure 4 by $f$, is retained outside by the projecting edges of the shank $a'$ and inside at $g$ by the bent-up wall itself.

After the parts have been soldered together, suitably the protruding edges are removed, preferably by grinding, so that the finished tool appears about as illustrated in Figure 5.

It is to be understood that the shape and arrangement of the perforations in the insert $c$ depend upon the requirements to be met in the special case, like the shape and the dimensions of the insert $c$ itself.

What I claim and desire to secure by Letters Patent is:—

1. As a new article of manufacture, an insert to be interposed between the shank and the tip of a composite tool or implement in soldering them together, said insert consisting of a piece of a ferrous metal covered on both sides with a solder and provided with perforations at least in the portion thereof which comes into contact with the said two parts to be soldered together.

2. As a new article of manufacture, an insert to be interposed between the shank and the tip of a composite tool or implement in soldering them together, said insert consisting of a piece of a ferrous metal covered on both sides with a solder and provided with perforations at least in the portion thereof which comes into contact with the said two parts to be soldered together, the area of the insert being such as to project beyond the parts to be soldered together, the projecting margins being bent so as to form troughs extending along the sides of said parts and toward said tip.

3. A tool composed of a steel shank, a tip having a high cutting capacity, a perforated metallic insert between said shank and tip, and a continuous body of solder extending through the perforations of said insert and between the opposed surfaces of said tip, insert, and shank.

4. A tool composed of a steel shank, a tip having high cutting capacity, and a joining layer between said tip and shank consisting of a matrix in the form of a perforated metal sheet and a continuous body of solder extending through the perforations of said matrix and between the opposed surfaces of said tip, said matrix, and said shank.

RICHARD BRAUN.